United States Patent [19]

Dellrud et al.

[11] Patent Number: 4,850,333
[45] Date of Patent: Jul. 25, 1989

[54] OUTDOOR BARBEQUE GRILL

[75] Inventors: Rolf Dellrud, Trosa; Ulf Hagström, Sollentuna, both of Sweden

[73] Assignee: Komfortventilation Teknik AB, Sodertalje, Sweden

[21] Appl. No.: 238,341

[22] PCT Filed: Mar. 6, 1987

[86] PCT No.: PCT/SE87/00115
§ 371 Date: Aug. 29, 1988
§ 102(e) Date: Aug. 29, 1988

[87] PCT Pub. No.: WO87/05197
PCT Pub. Date: Sep. 11, 1987

[30] Foreign Application Priority Data

Mar. 7, 1986 [SE] Sweden .............................. 8601071

[51] Int. Cl.$^4$ .............................................. F24B 1/00
[52] U.S. Cl. ........................... 126/25 A; 126/25 R; 126/41 R; 126/51
[58] Field of Search .............. 126/25 R, 25 A, 9 R, 126/51, 41 R

[56] References Cited

U.S. PATENT DOCUMENTS

| | | | |
|---|---|---|---|
| 1,656,181 | 1/1928 | Elbert | 126/25 A |
| 2,821,187 | 1/1958 | Tescula | 126/9 R |
| 2,923,229 | 2/1960 | Halford | 126/25 A |
| 2,946,275 | 7/1960 | Compton | 126/25 A |
| 3,122,134 | 2/1964 | Reeves | 126/41 |
| 3,343,527 | 9/1967 | Manteris | 126/25 R |
| 4,089,258 | 5/1978 | Berger | 126/39 J |
| 4,120,237 | 10/1978 | Mecherlen | 126/25 A |

Primary Examiner—Randall L. Green
Assistant Examiner—Christopher Hayes
Attorney, Agent, or Firm—Sughrue, Mion, Zinn, Macpeak and Seas

[57] ABSTRACT

A grill comprises a heating chamber (2) for broiling food (18). The heating chamber has located on the sides thereof a respective space (5) which accommodates a heat source (6), such as charcoal. The heat source (6) delivers radiant heat uniformly to the food (18), and the formation of carcinogenic substances as a result of pyrolysis is avoided by constructing the bottom part of the heating chamber in a manner to cool fat which drips down from the broiled food. To this end the bottom part of the heating chamber may be provided with a withdrawable vessel (8) filled with a liquid (9). The heat-source accommodating space (5) is delimited on the heating-chamber side by a net or lattice structure (4) and has a bottom surface (14) which slopes obliquely downwards and inwards towards the liquid-filled vessel (8). Pre-heated combustion air is delivered to the space (5) through a channel (16) location beneath the space. The central part of the grill may have a rectangular or circular cross-sectional shape.

11 Claims, 2 Drawing Sheets

OUTDOOR BARBEQUE GRILL

FIELD OF THE INVENTION

The present invention relates to an outdoor grill of the kind which incorporates a heat chamber or fire-box for broiling food that is either placed therein or carried on an overlying food-support grid, and which further incorporates a space for accommodating a heat-generating source, e.g. charcoal, in lump or briquette form, pine cones, heated stones and like materials, which is intended to radiate heat uniformly onto the food to be broiled, in a manner to prevent parts of the food from being burnt or overcooked, or coated with soot, and in which grill the bottom wall of the heating chamber presents means for cooling fats and juices which drip from the food as it is broiled, said means including a preferably withdrawable vessel for accommodating liquids, such as wine, water or a common salt solution.

BACKGROUND PRIOR ART DE-B-364.465 (Meta Hanss et al) describes a closed oven of this kind, in which the heat source comprises heat generating bodies which extend along sides of the oven, and in which the cooling means include dish-shaped vessels which are carried in a liquid-filled, withdrawable larger vessel, such as to cool the undersurfaces of the dish-shaped vessels. The oven can be used as a grill, using a heat source in the form of charcoal, briquettes, etc., of the aforesaid kind. The indirect cooling of the dish-shaped vessels also serves to negate effectively fat and juices dripping from the food as it is broiled, therewith eliminating any deliterious effects.

U.S. Pat. No. 3.343.527 (Manteris) also describes a grill of the aforesaid kind, in which a semi-cylindrical two-part hood is arranged above the food-supporting grid and the heat source, the hood construction being such as to enable one part of the hood to be displaced on the other. The object of the hood is to distribute heat as uniformly as possible around the hood, so as to heat both the top and bottom surfaces of the food on the grid.

One disadvantage with this outdoor drill, however, is that the smoke generated by the heat source is unable to escape to the atmosphere and adheres to the food in the form of carcinogenic soot particles.

DE-A-3.021.987 (Ballies) describes a grill in which the heat source is located in a hemispherical or semicylindrical heating chamber located beneath a food-supporting grid, in which the radiant heat is intended to act upon different food items at right angles, subsequent to bouncing from the walls of the heating chamber, thereby avoiding the loss of laterally directed radiation, among other things. Furthermore, by placing the food-supporting grid on both sides of the heat-source accommodating space, it is ensured that no fat or juices will drip onto the glowing charcoal, thereby avoiding the generation of smoke and consequently also the formation of soot on the food being broiled.

DE-A-3.312.041 (Engelhardt) describes a square drill with a centrally arranged square food-supporting grid. Beneath the grid and sloping down towards the centre of the grill is a fat-collecting vessel, while the heat-source accommodating space is located externally of the sides thereof.

This grill also affords the advantage that no fat or juices are able to drip onto the charcoal or like heat source thereby avoiding the generating of smoke and the deposit of carcinogenic substances on the food being broiled. Furthermore, it is also reported that the charcoal can be burned completely and uniformly, even when there is no wind.

DE-A-1.803.466 (Normbau) describes and illustrates a grill which comprises a centrally arranged, vertically extending container which accommodates the heat source and which is delimited on both sides by lattice or net structures and which has located on the sides thereof rotatable foodholding devices for holding the food to be grilled. Fat-collecting dishes are located beneath the food holding devices. The distance of the food-holding devices from the heat source can be adjusted. This grill also affords the advantage that no fat or juices will drip onto the charcoal.

DE-A-3.320.677 (Kittler) describes a grill arrangement which has the form of a large chest or container of rectangular cross-section. Arranged centrally in the chest is a food-supporting grid arrangement, while a heat-source accommodating space delimited by a grid structure is arranged on both sides of the food-supporting grid. A fat-collecting vessel is located beneath the food-supporting grid.

FR-B-782.307 (Ottenstein) describes a grill that has the form of an insulated, vertically arranged heating chamber having incorporated in the side-walls thereof an electric heat source in the form of resistance wires. Food to be grilled is fixed onto a spit located centrally in the heating chamber. Fat drips from the food being broiled onto the bottom of the heating chamber, which is conical in shape and perforated so as to allow the hot fat to pass therethrough and collect in a dish-like container placed outside the grill itself.

Thus, there are known to the art grills which are constructed in a manner to prevent fat from dripping onto the heat source and therewith forming carcinogenic substances which subsequently deposit on the food. However, all of these grills have the serious disadvantage that fat drips onto the hot surfaces within the actual grill itself. Fat which comes into contact with a hot grill surface will generate, through pyrolysis, polycyclic aromatic hydrocarbons (PAH), which then rise in the grill and condense on the food being cooked.

PAH are also produced by two further major mechanisms, namely by excessively high surface temperatures of the broiled food and by smoke fumes generated by incomplete combustion of the fuel.

Benzo(a)pyrene is a polyaromatic hydrocarbon which is considered to be carcinogenic. The relationship between cancer and remaining polycyclic aromatic hydrocarbons has not been clearly established, although there are grounds to suppose that several polycylclic aromatic hydrocarbons are also carcinogenic (inter alia benzo(b)pyrene).

CH-B-471.572 (Debonneville) describes a grill which comprises a heat-source accommodating space delimited by means of a net or lattice structure, and a heating chamber in which the food to be grilled or broiled is placed. This grill, however, lacks means for cooling the fat and juices that drip from the food. This grill is also encumbered with some of the aforementioned disadvantages. Furthermore, as with most of the other grills, the fuel is not always combusted fully satisfactorily, which results in insufficient heating of the food being cooked, or in uneven distribution of the radiant heat.

It will be seen from the above resume of the present state of the art that when constructing the known grills attempts have been made to avoid the problems associated with the pyrolysis of fat which drips onto the hot fuel. However, there still remains, inter alia, the problem of PAH-generation at high grill temperatures, and not least the problem associated with the pyrolysis of fat that falls onto hot surfaces of the grill itself. Problems are also to be encountered in conjunction with the actual combustion of the fuel and in the handling of fuel residues subsequent to using the grill.

OBJECTS OF THE INVENTION

The object of the present invention is to provide an improved grill of the aforesaid kind with which the aforementioned problems still unsolved by the known grills are substantially eliminated.

BRIEF DISCLOSURE OF THE INVENTION

This object and others are achieved by means of a grill of the aforesaid kind which, in accordance with the invention, is mainly characterized in that the space which accommodates the heat source is delimited on the heating chamber side by means of a net or lattice structure and has a bottom wall which slopes obliquely downwards and inwards towards the liquid-filled vessel located at the bottom of the heating chamber and intended to receive fat dripping from the food being cooked.

A grill that is constructed in accordance with the invention has the ability to distribute radiant heat uniformly and will greatly restrict the formation of polycyclic aromatic hydrocarbons (PAH). Because the fat and other juices that drip from the food are received in a liquid-filled vessel in the bottom of the heating chamber the risk of PAH-generation as a result of pyrolysis due to contact of the fat with the hot grill surfaces is essentially totally eliminated.

Thus, the inventive grill prevents the occurrence of burnt and soot-coated surfaces on the broiled food and also excludes the risk of dripping fat catching on fire and sooting the food being grilled thereby greatly reducing the risk of contact with carcinogenic substances by the person consuming the food.

The fact that when using the inventive grill fat which drips from the food is unable to vapourize and condense on the food also affords the physiological advantage, from the aspect of nutrition that the fat content of the broiled food will also be depleted.

Furthermore, a grill that is constructed in accordance with the invention also enables the heat source to combust more efficiently and more effectively, so that the energy content of the heat source can be utilized to the full and so that the food is subjected to high temperatures and uniformly dispersed radiant heat. The grill also enables the heat-source residues to be removed and disposed of in a ready manner, after using the grill.

In accordance with one advantageous further embodiment of the invention the sloping bottom wall of the heat-source accommodating space incorporates means for pre-heating combustion air delivered to the heat source. This greatly facilitates the process of combustion and enables combustion temperatures to be controlled in an optimum manner, such that the food will be subjected uniformly to radiant heat. Furthermore, means may be provided for regulating the air supply and also for influencing the turbulence of the gases of combustion and their residence time in the combustion chamber.

The pre-heating means may suitably include a channel which is incorporated in the aforesaid sloping bottom and which has at least one inlet aperture which opens to the atmospheric surroundings and at least one outlet aperture which opens into the heat-source accommodating space.

The outlet aperture of the channel may be located in the vicinity of its respective grill side-wall, although it may optionally be located at the other end of the channel, i.e. in the vicinity of the delimiting net or lattice structure that extends between the heating chamber and the space accommodating said heat source This outlet aperture may consist of a slot which extends along said grill side-wall. Alternatively, the side-wall may have a multiple of outlet apertures formed therein In accordance with one embodiment of the invention, the heat-source accommodating space may be defined or delimited by a grill side-wall from whose bottom edge the aforesaid sloping bottom wall extends at an angle of 20°–70°, preferably 30°–60°, and more suitably at an angle of about 45° in relation to the horizontal, down to a location spaced from the upper surface of the liquid in said liquid-containing vessel.

The net or lattice structure which delimits the heat-source accommodating space from the heating chamber is preferably capable of being moved in a vertical and/or lateral direction, such as to enable the heat source to slide down into the underlying liquid-containing vessel subsequent to displacing the net or lattice delimiting structure.

When the heat source has completely burned out, all that is necessary is to lift the net or lattice structure, or to slide it to one side, and the combustion residues, e.g. ash and cinder, will then slide automatically into the liquid filled vessel, which is preferably withdrawable, where said residues are quickly cooled to a temperature at which they can be comfortably handled.

The heating chamber may also be constructed to receive a removable cooking grid which extends vertically, and which possibly is laterally movable within the grill. In certain instances it may be suitable to place the food to be broiled on or within such a vertically extending grid which i.a. affords the advantage that the food is simultaneously exposed to radiant heat from several directions.

The space accommodating the heat source may be covered with a lid, which may be conveniently hinged on an external hinge device which permits the lid, when raised, to act as a wind shield.

The combustion efficiency of the grill can be further improved, by incorporating in the channel for pre-heated combustion air a valve device by means of which the amount of air supplied to the space can be regulated. Alternatively, or in addition thereto, the combustion air can be fed to the channel by means of a fan, preferably a variable speed fan.

The inventive grill will preferably have a rectangular configuration in horizontal cross-section, although it may have any poligonal horizontal cross-sectional shape, or a more or less circular cross-sectional shape. The foodsupporting grid, or grate, is preferably mounted so as to enable it to be placed in alternative height positions in relation to the heating chamber.

All types of combustible material can be used with the inventive grill. Thus, the heat-source accommodated in the aforesaid space may have the form of lava-stone capable of being heated, e.g., by a gas burner.

However, it is preferred to use more conventional types of fuel, such as charcoal in lump or briquette form.

One important advantage afforded by the aforedescribed particular embodiments of the invention in relation to known grills of this kind is that by pre-heating the combustion air, there is obtained a more complete combustion of the combustible fuel, resulting in less non-combusted fuel debris and greater efficiency. However, in order to achieve this, it is necessary to optimize the supply of combustion air, i.e. to supply the air at the correct location and in the correct amounts This is accomplished with a grill constructed in accordance with the present invention.

The outer surface temperature of the grill can be lowered substantially, by providing the grill with an external insulating layer, around the outer walls thereof. The presence of such insulation will also enhance the total efficiency of the combustion process.

Conventional grills are often manufactured from a non-alloyed metal plate, which means that the grill will have but a short useful life. A grill constructed in accordance with the invention is preferably made of a rust-proof and heat-resistant material, so as to prolong the useful life of the grill.

The food-supporting grid or grate of the grill is preferably coated with Teflon, so as to facilitate removal of grease and food residues from the grid. This also renders the grill more hygenic and enables it to be cleaned more easily after use.

A number of exemplifying embodiments of the invention will now be described in more detail with reference to the accompanying schematic drawings.

DESCRIPTION OF PREFERRED EMBODIMENTS

Figure 1:
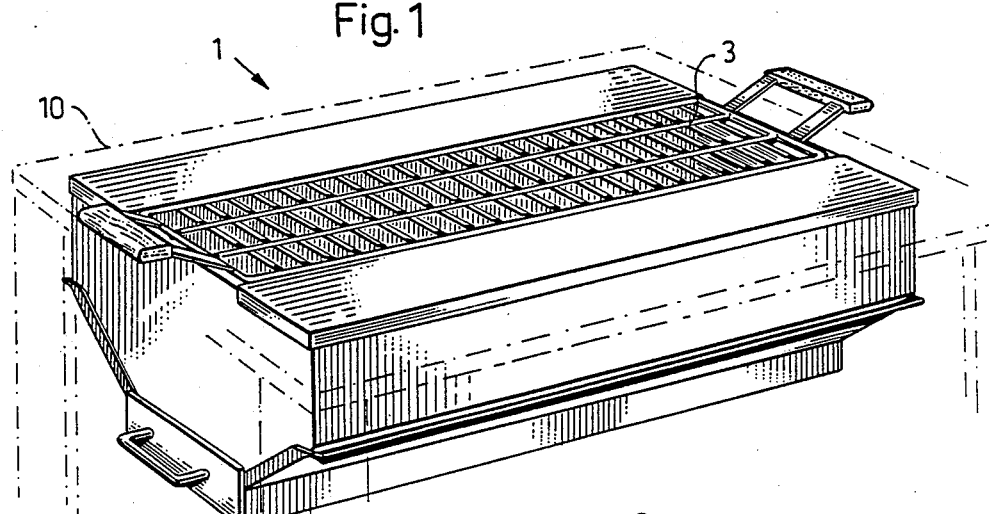
FIG. 1 is a perspective view of one embodiment of a grill constructed in accordance with the invention.

In the drawings, the reference numeral 1 identifies a grill constructed in accordance with the invention and capable of being supported on a suitable stand or on suitably constructed leg supports, as illustrated by chain lines 10.

The grill is defined by side-walls and a bottom wall, and includes a food-supporting grid or grate 3 which can be adjusted to different positions in the grill.

The grid 3 is located above a central heating chamber 2 which is delimited on all sides by a respective net or lattice structure 4. On respective outwardly located sides of the illustrated lattice structures 4 there is located a space 5 which accommodates a heat source 6, for instance charcoal briquettes. The space 5 is defined outwardly by a respective side-wall 11 and downwardly by a sloping bottom plate 14, and each space is covered by a respective removable lid 13.

A channel 16 for supplying pre-heated combustion air to respective spaces 5 is defined on one side by the bottom plate or wall 14 defining the space 5 The channel has a supply inlet 16a which opens towards atmospheric surroundings, and two outlets 14b which open into the space 5. The channel 16 is defined downward.-y by a wall 15.

As will be seen from the Figures, the grill is symmetrical about a central longitudinal median plane.

The bottom part of the centrally located heating chamber 2 comprises a withdrawable chest or drawer 8, which is intended to contain a liquid 9, e.g. wine, water or a common salt solution, serving to cool hot fat and juices which drip down from food 18 broiled on the grill. As a result, such fat drippings will not come into contact with hot grill surfaces and form carcinogenic substances, through pyrolysis, liable to deposit on the grilled food This draining of fat also depletes the fat content of the food 18.

Furthermore, a withdrawable drawer or chest of this kind can be easily cleaned.

The mountings for supporting the grid 3 are such as to enable the grid to be placed in various height positions relative to the heat-source 6, at a comparitively long distance from said heat source. To this end the grill shown in FIG. 3 has located in the heating chamber 2 small shelves 19 on which legs 3a on the grid 3 can rest, provided that the legs are inserted through holes 20 provided in the grill frame and intended herefor, said holes 20 being in register with the shelves 19.

The pre-heated air of combustion supplied to the space 5 through the channel 16 results in uniform and complete combustion of the briquettes 6, whereby the food 18 is subjected uniformly to radiant heat from the heating chamber, therewith eliminating the risk that some parts of the food will be burned or overcooked. The channel 16 may be provided with suitable valve means (not shown) for regulating the amount of combustion air supplied to an associated heat-source accommodating space 5.

In the illustrated embodiment, each of the spaces 5 is divided by a partition 21 into two compartments, the volumetric capacity of one compartment corresponding to one third of the total capacity of the associated space 5 and the other compartment corresponding to two thirds of said total capacity. Thus, when broiling or grilling solely one item of foodstuff, or just a few items, it may suffice to fill only the smaller compartment with briquettes, while more items of foodstuff may require the larger compartment to be filled. Naturally, when a large number of items of foodstuff are to be grilled all compartments are filled.

As will be understood, it is not always necessary to provide a raisable and lowerable grid 3 of the kind illustrated in the Figures. For example, in certain instances the grid may be replaced with a gridiron (not shown) which can be lowered into the heating chamber. Alternatively, the food to be grilled or broiled can be affixed to a spit, optionally a rotary spit, having a horizontal or vertical axis and arranged in the heating chamber.

Figure 2:
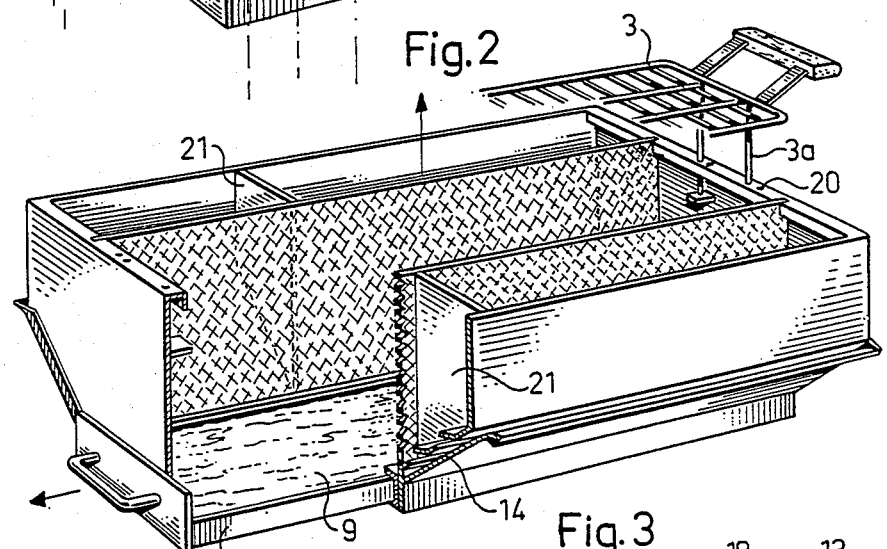
FIG. 2 is a partially cut-away view, similar to that of FIG. 1, but with certain parts of the grill removed so as to show the internal construction of the grill.
Figure 3:
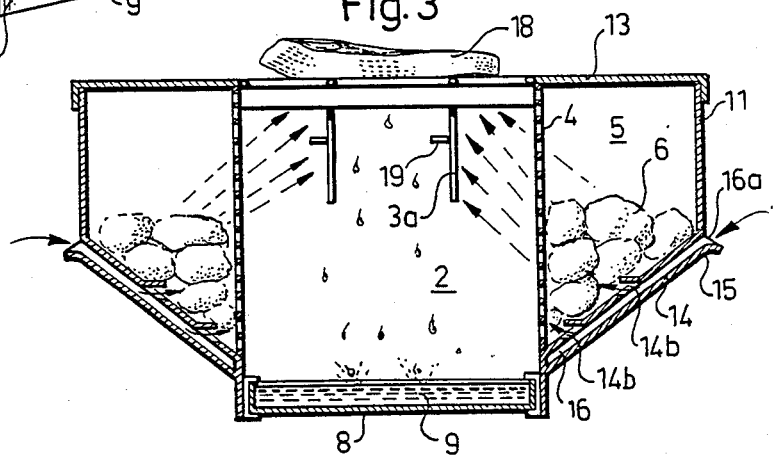
FIG. 3 illustrates the grill of FIGS. 1 and 2 in use.
Figure 4:
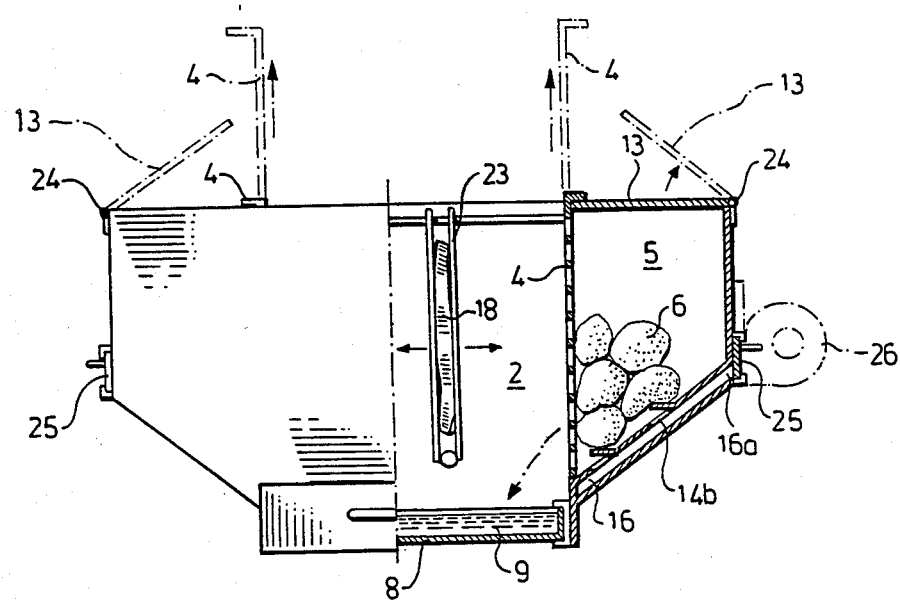
FIG. 4 illustrates a slightly modified form of the grill shown in FIG. 3.

The grill embodiment illustrated in FIG. 4 differs slightly from the grill embodiment illustrated in FIGS. 1-3.

Thus, the net or lattice delimiting structure 4 of this embodiment is movable in a vertical direction. Consequently, subsequent to using the grill all that is needed is to raise the net or lattice structure 4 in order for the combustion residues in the space 6 to slide down the sloping bottom 14 into the liquid 9 in the vessel 8, where the residues are quickly cooled. Since the draw or chest 8 is withdrawable, the combustion residues can be easily dealt with.

As illustrated in chain lines, the lid 13 can be pivoted about an outer hinge 24, and can be swung to an intermediate position in which it shields the food 18 from the wind. The radiant heat emanating from the heat source can also be controlled to some extent in this way.

A throttle device 25 for regulating the amount of air supplied to the space 5 is located in the vicinity of the inlet 16a of the channel 16 in which combustion air is pre-heated.

Alternatively, the throttle device may be replaced with or used in conjunction with a fan 26, preferably a variable speed fan. The fan may be driven from the mains or from a battery, or may optionally be driven by solar cells.

The heat source 6 in the space 5 may, for instance, consist of lava-stones heated by a gas burner, these stones being cleansed in the liquid bath 9 after use.

The net or lattice delimiting structure 4 may optionally be horizontally displaceable, i.e. capable of being moved out of one or both of the end walls of the grill.

The illustrated food-supporting grid or grate 3 may be replaced with a vertical food-support 23 capable of being lowered into the heating chamber. This vertical food support may have the form of a perforated device arranged to fully embrace the food to be broiled. This means that the food will be subjected to radiant heat on all sides thereof simultaneously. This vertically depending grid-arrangement may suitably be mounted for movement in a lateral direction.

Figure 5:
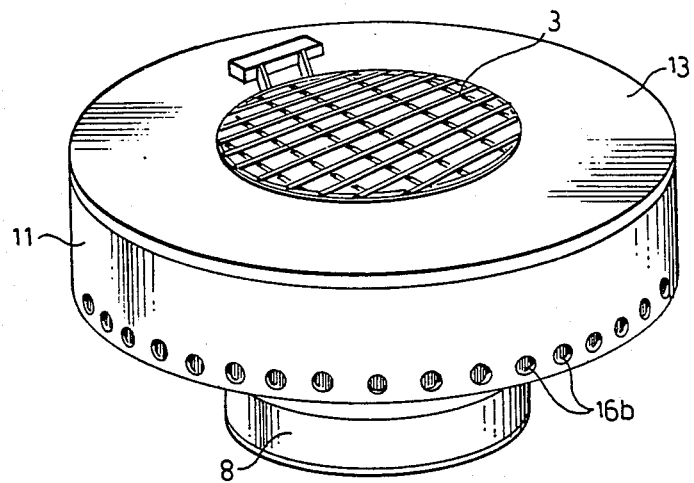
FIG. 5 is a perspective view of a cylindrical grill according to the invention.

FIG. 5 illustrates a grill of circular-cylindrical configuration, the heating chamber consisting of a central annulus. Thus, in this case, the heat-source accommodating space 5 encircles the central heating chamber. The heat-source accommodating space 5 of this embodiment also has a sloping bottom plate, said plate being inclined to the horizontal at an angle of 20°–70°, preferably 30°–60° and suitably about 45°. The lowermost part of the bottom plate terminates at a distance from the surface level of the liquid in the vessel 8. The food-supporting grid 3 of this embodiment has a circular shape.

The channel 16 for supplying and heating air of combustion presents to the atmospheric surroundings a multiple of inlet apertures in the form of round holes 16b.

One important advantage afforded by all embodiments of the inventive grill is that no unpleasant odours are produced, to the benefit of the external surroundings.

I claim:

1. A cooking grill comprising: a heating chamber (2), a food-supporting grid (3) mounted above or within said heating chamber, a space (5) for accommodating a heat source (6) in the form of charcoal briquettes, pine cones, heated stones or the like, intended to direct radiant heat uniformly onto food (18) broiled by the grill to avoid hard, burned food surfaces or soot-coated food surfaces, a bottom wall of the heating chamber being provided with means for cooling fat which drips from the broiled food, said cooling means including a withdrawable vessel (8) for accommodating a liquid (9) such as wine, water or a common salt solution, the heat-source accommodating space being laterally offset from the supporting grid and being delimited on a side thereof adjacent the heating chamber by a net or lattice structure (4), and having a bottom surface (14) which slopes obliquely downwards and inwards towards the liquid-filled vessel located at the bottom of the heating chamber and intended to receive said fat drippings, wherein the sloping bottom surface is provided with channel means (16) for pre-heating combustion air delivered to the heat source, and wherein the channel means has at least one inlet (16a) opening to the surrounding atmosphere, and at least one exit aperture (14b) which opens into the heat-source accommodating space.

2. A cooking grill, comprising: a heating chamber (2), a food-supporting grid (3) mounted above or within said heating chamber, a space (5) for accommodating a heat source (6) in the form of charcoal briquettes, pine cones, heated stones or the like, intended to direct radiant heat uniformly onto food (18) broiled by the grill to avoid hard, burned food surfaces or soot-coated food surfaces, a bottom wall of the heating chamber being provided with means for cooling fat which drips from the broiled food, said cooling means including a withdrawable vessel (8) for accommodating a liquid (9) such as wine, water or a common salt solution, the heat-source accommodating space being laterally offset from the supporting grid and being delimited on a side thereof adjacent the heating chamber by a net or lattice structure (4), and having a bottom surface (14) which obliquely downwards and inwards toward the liquid-filled vessel located at the bottom of the heating chamber and intended to receive said fat drippings, wherein the sloping bottom surface is provided with channel means (16) for pre-heating combustion air delivered to the heat source, and wherein the channel means incorporates a throttle device (25) for regulating the supply of combustion air.

3. A cooking grill, comprising: a heating chamber (2), a food-supporting grid (3) mounted above or within said heating chamber, a space (5) for accommodating a heat source (6) in the form of charcoal briquettes, pine cones, heated stones or the like, intended to direct radiant heat uniformly onto food (18) broiled by the grill to avoid hard, burned food surfaces or soot-coated food surfaces, a bottom wall of the heating chamber being provided with means for cooling fat which drips from the broiled food, said cooling means including a withdrawable vessel (8) for accommodating a liquid (9) such as wine, water or a common salt solution, the heat-source accommodating space being laterally offset from the supporting grid and being delimited on a side thereof adjacent the heating chamber by a net or lattice structure (4), and having a bottom surface (14) which slopes obliquely downwards and inwards toward the liquid-filled vessel located at the bottom of the heating chamber and intended to receive said fat drippings, wherein the sloping bottom surface is provided with channel means (16) for pre-heating combustion air delivered to the heat source, and further comprising a variable speed fan (26) for supplying combustion air to the channel means.

4. A grill according to claims 2 or 3, wherein the channel means has at least one inlet (16a) opening to the surrounding atmosphere, and at least one exit aperture (14b) which opens into the heat-source accommodating space.

5. A grill according to any of claims 1, 2 or 3, wherein the heat-source accommodating space is also delimited by a side-wall (11) of the grill, the bottom surface (14) sloping down from a bottom edge of the side-wall at an angle of 20°–70° to a horizontal plane, to a location spaced from an upper surface of the liquid (9) in the vessel (8).

6. A grill according to any of claims 1, 2 or 3, wherein the net or lattice structure (4) delimiting the heat-source accommodating space (5) on the heating chamber side thereof is vertically or laterally movable to enable the heat source to slide into the vessel (8) upon displacement of said net or lattice structure.

7. A grill according to any of claims 1, 2 or 3, wherein the heating chamber (2) is constructed to receive a removable, vertically extending food-support grid (23).

8. A grill according to any of claims 1, 2, or 3, wherein the heat-source accommodating space is covered by a lid (13) hinged on an external hinge device (24), such as to enable the lid to be raised to a position in which it acts as a wind shield.

9. A grill according to claims 1 or 3, wherein the channel means incorporates a throttle device (25) for regulating the supply of combustion air.

10. A grill according to claim 1 or 2, further comprising a variable speed fan (26) for supplying combustion air to the channel means.

11. A grill according to any of claims 1, 2 or 3, wherein the heating chamber comprises a centrally located cylindrical space, and the heat-source accommodating space (5) encircles said heating chamber.

* * * * *